(12) United States Patent
Uppala

(10) Patent No.: US 6,279,007 B1
(45) Date of Patent: Aug. 21, 2001

(54) ARCHITECTURE FOR MANAGING QUERY FRIENDLY HIERARCHICAL VALUES

(75) Inventor: Radha Krishna Uppala, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/201,239

(22) Filed: Nov. 30, 1998

(51) Int. Cl.⁷ .................................................. G06F 17/30
(52) U.S. Cl. ........................... 707/101; 707/100; 707/104
(58) Field of Search ..................................... 707/100, 101, 707/1–6, 10, 103, 104

(56) References Cited

U.S. PATENT DOCUMENTS 5,768,532 * 6/1998 Megerian ............................. 709/245
5,978,795 * 11/1999 Poutanen et al. ........................ 707/3

OTHER PUBLICATIONS

Stillger et al "AquES: An Agent–based Query Evaluation System", IEEE 1977, pp. 203–212.*
Kitsuregawa et al "Query Execution for Large Relations on Functional Disk System", IEEE 1989, pp. 159–167.*
Lehman et al "Query Processing in Main Memory Database Management Systems", ACM 1986, pp. 239–250.*

* cited by examiner

Primary Examiner—Thomas Black
Assistant Examiner—Uyen Le
(74) Attorney, Agent, or Firm—Lee & Hayes, PLLC

(57) ABSTRACT

An architecture for managing query friendly hierarchical values contains a data structure having node value entries for node values that make up the hierarchical values, hierarchical value entries for the hierarchical values expressed in terms of node value identifiers found in the node value entries, and hierarchy parent entries for parent-child pairs of hierarchy values. A node value entry contains a node value, a node hash value generated from the node value by a first hashing algorithm, and the node value identifier. The node hash value defines the node value entry in which the corresponding node value is stored. The hierarchical value entry contains a hierarchical value represented by the node value identifiers that correspond to the node values that make up the hierarchical value. The hierarchical value entry also contains a hierarchical value hash value derived from the node value identifier representation of the hierarchical value using a second hashing algorithm and a hierarchical value identifier. The hierarchical value hash defines the hierarchical value entry in which the corresponding hierarchical value is stored. A hierarchy parent entry contains the hierarchical value identifier for the parent hierarchical value and the hierarchical value identifier for the child hierarchical value. The hierarchy parent entry also contains a depth value representing the distance in nodes between the parent hierarchical value and the node in the child hierarchical value that is furthest from the parent.

21 Claims, 17 Drawing Sheets

700

| | 703 | 705 | 707 |
|---|---|---|---|
| | Node ID | Node Hash Value | Node Value |
| 701 | 1001 | 14203 | A |
| 701 | 1002 | 134504 | B |
| 701 | 1003 | 294055 | C |
| 701 | 1004 | 385475 | D |
| 701 | 1005 | 82048 | E |
| 701 | 1006 | 3095 | F |

710

| | 713 | 715 | 717 | 719 |
|---|---|---|---|---|
| | Hierarchical Value ID | Hierarchical Value Hash Value | Hierarchical Value | Comment |
| 711 | 10001 | 1420334 | 1001 | A |
| 711 | 10002 | 1345042 | 1001-1002 | A/B |
| 711 | 10003 | 2949553 | 1001-1002-1003 | A/B/C |
| 711 | 10004 | 3854754 | 1001-1002-1003-1004 | A/B/C/D |
| 711 | 10005 | 82048565 | 1001-1002-1004 | A/B/D |
| 711 | 10006 | 3905958 | 1001-1002-1004-1005 | A/B/D/E |
| 711 | 10007 | 4850904 | 1001-1003 | A/C |
| 711 | 10008 | 9385930 | 1001-1003-1005 | A/C/E |
| 711 | 10009 | 4850904 | 1001-1003-1005-1006 | A/C/E/F |

| | 203 | 205 | 207 | 209 |
|---|---|---|---|---|
| | Hierarchical Value ID | Parent Hierarchical Value ID | Node Value | Comments |
| 201 | 1000 | 0 | A | A |
| 201 | 1001 | 1000 | B | A/B |
| 201 | 1002 | 1001 | C | A/B/C |
| 201 | 1003 | 1002 | D | A/B/C/D |
| 201 | 1004 | 1001 | E | A/B/E |
| 201 | 1005 | 1004 | F | A/B/E/F |

FIG. 2 (Prior Art)

| | 303 | 305 |
|---|---|---|
| | Node ID | Node Value |
| 301 | 1 | A |
| 301 | 2 | B |
| 301 | 3 | C |
| 301 | 4 | D |
| 301 | 5 | E |
| 301 | 6 | F |

| | 313 | 315 | 317 | 319 |
|---|---|---|---|---|
| | Hierarchical Value ID | Parent Hierarchical Value ID | Node ID | Comments |
| 311 | 1000 | 0 | 1 | A |
| 311 | 1001 | 1000 | 2 | A/B |
| 311 | 1002 | 1001 | 3 | A/B/C |
| 311 | 1003 | 1002 | 4 | A/B/C/D |
| 311 | 1004 | 1001 | 5 | A/B/E |
| 311 | 1005 | 1004 | 6 | A/B/E/F |

| | 703 | 705 | 707 |
|---|---|---|---|
| | Node ID | Node Hash Value | Node Value |
| 701 | 1001 | 14203 | A |
| 701 | 1002 | 134504 | B |
| 701 | 1003 | 294055 | C |
| 701 | 1004 | 385475 | D |
| 701 | 1005 | 82048 | E |
| 701 | 1006 | 3095 | F |

| | 713 | 715 | 717 | 719 |
|---|---|---|---|---|
| | Hierarchical Value ID | Hierarchical Value Hash Value | Hierarchical Value | Comment |
| 711 | 10001 | 1420334 | 1001 | A |
| 711 | 10002 | 1345042 | 1001-1002 | A/B |
| 711 | 10003 | 2949553 | 1001-1002-1003 | A/B/C |
| 711 | 10004 | 3854754 | 1001-1002-1003-1004 | A/B/C/D |
| 711 | 10005 | 82048565 | 1001-1002-1004 | A/B/D |
| 711 | 10006 | 3905958 | 1001-1002-1004-1005 | A/B/D/E |
| 711 | 10007 | 4850904 | 1001-1003 | A/C |
| 711 | 10008 | 9385930 | 1001-1003-1005 | A/C/E |
| 711 | 10009 | 4850904 | 1001-1003-1005-1006 | A/C/E/F |

| | 723 | 725 | 727 | 729 |
|---|---|---|---|---|
| | Parent Hierarhical Value ID | Child Hierarchical Value ID | Depth Value | Comment |
| 721 | 10001 | 10001 | 0 | A - A |
| 721 | 10001 | 10002 | 1 | A - A/B |
| 721 | 10001 | 10003 | 2 | A - A/B/C |
| 721 | 10001 | 10004 | 3 | A - A/B/C/D |
| 721 | 10001 | 10005 | 2 | A - A/B/D |
| 721 | 10001 | 10006 | 3 | A - A/B/D/E |
| 721 | 10001 | 10007 | 1 | A - A/C |
| 721 | 10001 | 10008 | 2 | A - A/C/E |
| 721 | 10001 | 10009 | 3 | A - A/C/E/F |
| 721 | 10002 | 10002 | 0 | A/B - A/B |
| 721 | 10002 | 10003 | 1 | A/B - A/B/C |
| 721 | 10002 | 10004 | 2 | A/B - A/B/C/D |
| 721 | 10002 | 10005 | 1 | A/B - A/B/D |
| 721 | 10002 | 10006 | 2 | A/B - A/B/D/E |
| 721 | 10003 | 10003 | 0 | A/B/C - A/B/C |
| 721 | 10003 | 10004 | 1 | A/B/C - A/B/C/D |
| 721 | 10005 | 10005 | 0 | A/B/D - A/B/D |
| 721 | 10005 | 10006 | 1 | A/B/D - A/B/D/E |
| 721 | 10006 | 10006 | 0 | A/B/D/E - A/B/D/E |
| 721 | 10007 | 10007 | 0 | A/C - A/C |
| 721 | 10007 | 10008 | 1 | A/C - A/C/E |
| 721 | 10007 | 10009 | 2 | A/C - A/C/E/F |
| 721 | 10008 | 10008 | 0 | A/C/E - A/C/E |
| 721 | 10008 | 10009 | 1 | A/C/E/F - A/C/E/F |
| 721 | 10008 | 10009 | 0 | A/C/E/F - A/C/E/F |

| | 1113 | 1105 | 1107 |
|---|---|---|---|
| | Node ID | Node Hash Value | Node Value |
| 1101 | 1001 | 14203 | Topic |
| 1101 | 1002 | 134504 | Sports |
| 1101 | 1003 | 294055 | Basketball |
| 1101 | 1004 | 385475 | Sonics |
| 1101 | 1005 | 82048 | Football |
| 1101 | 1006 | 3095 | Arts |
| 1101 | 1007 | 905362 | Music |

| | 1113 | 1115 | 1117 | 1119 |
|---|---|---|---|---|
| | Hierarchical Value ID | Hierarchical Value Hash Value | Hierarchical Value | Comment |
| 1111 | 10001 | 1420334 | 1001 | Topics |
| 1111 | 10002 | 1345042 | 1001-1002 | Topics/Sports |
| 1111 | 10003 | 2949553 | 1001-1002-1003 | Topics/Sports/Basketball |
| 1111 | 10004 | 3854754 | 1001-1002-1003-1004 | Topics/Sports/Basketball/Sonics |
| 1111 | 10005 | 82048565 | 1001-1002-1005 | Topics/Sports/Football |
| 1111 | 10006 | 4850904 | 1001-1006 | Topics/Arts |
| 1111 | 10007 | 9385930 | 1001-1006 - 1007 | Topics/Arts/Music |

| | Parent Hierarhical Value ID (1123) | Child Hierarchical Value ID (1125) | Depth Value (1127) | Comment (1129) |
|---|---|---|---|---|
| 1121 | 10001 | 10001 | 0 | Topics - Topics |
| 1121 | 10001 | 10002 | 1 | Topics - Topics/Sports |
| 1121 | 10001 | 10003 | 2 | Topics -Topics/Sports/Basketball |
| 1121 | 10001 | 10004 | 3 | Topics - Topics/Sports/Basketball/Sonics |
| 1121 | 10001 | 10005 | 2 | Topics - Topics/Sports/Football |
| 1121 | 10001 | 10006 | 1 | Topics - Topics/Arts |
| 1121 | 10001 | 10007 | 2 | Topics - Topics/Arts/Music |
| 1121 | 10002 | 10002 | 0 | Topics/Sports - Topics/Sports |
| 1121 | 10002 | 10003 | 1 | Topics/Sports - Topics/Sports/Basketball |
| 1121 | 10002 | 10004 | 2 | Topics/Sports - Topics/Sports/Basketball/Sonics |
| 1121 | 10002 | 10005 | 1 | Topics/Sports - Topics/Sports/Football |
| 1121 | 10003 | 10003 | 0 | Topics/Sports/Basketball - Topics/Sports/Basketball |
| 1121 | 10003 | 10004 | 1 | Topics/Sports/Basketball - Topics/Sports/Basketball/Sonics |
| 1121 | 10004 | 10004 | 0 | Topics/Sports/Basketball/Sonics - Topics/Sports/Basketball/Sonics |
| 1121 | 10005 | 10005 | 0 | Topics/Sports/Football - Topics/Sports/Football |
| 1121 | 10006 | 10006 | 0 | Topics/Arts - Topics/Arts |
| 1121 | 10006 | 10007 | 1 | Topics/Arts - Topics/Arts/Music |
| 1121 | 10007 | 10007 | 0 | Topics/Arts/Music - Topics/Arts/Music |

FIG. 11C

ARCHITECTURE FOR MANAGING QUERY FRIENDLY HIERARCHICAL VALUES

FIELD OF THE INVENTION

This invention relates generally to data storage and retrieval, and more particularly to data structures used in storing and retrieving hierarchical strings.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright©1997, Microsoft Corporation, All Rights Reserved.

BACKGROUND OF THE INVENTION

A node in a hierarchical data structure can be addressed by traversing a data tree from a top, or root, node down through the "branches" of the data tree until reaching the target node. The path from the root node to the target node can be used to uniquely identify the node. Thus, in a data tree, such as data tree 100 shown in FIG. 1, node D 109 is uniquely defined by the string A/B/C/D, referred to as a "hierarchical value." Each node above the node D 109 is a "parent" node for node D 109, i.e., node A 101, node b 103, and node c 105, and node D 109 itself is a "child" node for each of its parent nodes 101, 102 and 103. The node values of A, B, C and D in the hierarchical value can be replaced by other identifiers that define the parent nodes of the target node.

Traditional approaches to storing hierarchical values in standard relational databases create inefficiencies in performing database queries on the hierarchical values as can be seen in referring to the tables in FIG. 2 used to store the hierarchical values for the data tree 100 of FIG. 1. Hierarchical values for nodes are stored in multiple rows 201 in a relational database table 200. Each row 201 contains a hierarchical value identifier 203 (assigned when the node is stored and often the next number in a sequence of identifiers) for a node, a parent hierarchical value identifier 205 that defines the immediate parent node, and the node value 207. Comment column 209 contains the hierarchical value defining the node in the row and is shown in the table 200 to clarify the explanation of the table 200 but is not usually stored as part of the table 200.

The structure of the table 200 provides for very efficient updates, such as inserting a new parent node, deleting a node, or renaming a node. However, the structure of the table 200 requires traversing many rows of the table 200 to find all children nodes of a particular parent node or all children nodes N levels down in the hierarchy.

For example, suppose a user wants to know all the children of node A 101. First, the hierarchical value of "A" must be converted to the corresponding hierarchical value identifier by searching table 200 to find the row 201 with a node value 207 matching "A." Once found, the hierarchical value identifier 205 for node A, or 1000 in this example, is used to search the table 200 to find all rows 201 with a parent hierarchical value identifier equal to 1000. The node values 207 of all the matching rows 201 are cached, usually in memory, for return to the user. In the current example, only child node B for parent node A is found at this level. However, the query is not completely satisfied as deeper levels of children nodes for parent node A remain on the A/B branch of the data tree 100. Therefore, the hierarchical value identifier 205 for A/B (1001) is used to find the children nodes of A/B. In the table 200, two children nodes for A/B exist, A/B/C and A/B/E. Both the A/B/C and A/B/E branches of data tree 100 must be searched in the table 200 to find even deeper children nodes of parent node A. The search of the table 200 ends when the deepest node in all branches descending from parent node A have been found. The cached values are then returned to the user as the query result.

A similar traversing of the table 200 happens when a user wants to find all the children nodes of parent node A 101 that are four levels deep in the hierarchy of the data tree 100. Counting parent node A 101 as level one, such a query will return hierarchical values A/B/C/D and A/B/E/F. However, the query process must traverse the entire table 200 as described above to return these two hierarchical values. The query process also must also keep track of its current depth within the hierarchy in order to know when it has reached the fourth level. Additional queries such as "all children greater than two and less than five levels deep" require still more logic in the query processing software.

Furthermore, determining the hierarchical value identifier for an existing hierarchical value or determining the hierarchical value represented by a hierarchical value identifier also requires a similar traversing of the table 200.

The two tables shown in FIG. 3 present a normalized version of the table 200 which eliminates the duplication of node values within the table 200 by storing the node values in a separate table 300 and assigning a node identifier 303 to each node value 305. The node identifiers 303 are then used in the table 310 instead of the actual node values 207 which are shown in the table 200. Although the normalization decreases the amount of data stored in the table 300, it does not increase the efficiency of queries run against the tables 300 and 301.

An alternate approach to speed up queries by using a relational database table with a different structure to store the hierarchical values. The table 400 in FIG. 4 stores the hierarchical value 407 for a node as a full string in each row 401 in the table 400. Each row 401 also contains a depth value 405 which represents the child node's position below the highest parent node in terms of level depth. Querying for all children nodes of a particular parent node matches the hierarchical value for the parent node against the full string 407 in each row ("prefix string match query"). With this approach it is also possible to query on children nodes of a certain depth in the hierarchy without the special processing described above. However, prefix string match queries are highly inefficient for all but the smallest tables. Moreover, the database table structure shown in FIG. 4 requires more processing for update operations, and the size of the hierarchical value 407 can easily exceed the column limit for many relational database implementations.

Therefore, the is a need for a system that can quickly process complex queries on data stores containing hierarchical values with minimal impact on the processing time required to insert new hierarchical values in the data store.

SUMMARY OF THE INVENTION

The above-mentioned shortcomings, disadvantages and problems are addressed by the present invention, which will be understood by reading and studying the following specification.

An architecture for managing query friendly hierarchical values contains a data structure having node value entries for node values that make up the hierarchical values, hierarchical value entries for the hierarchical values expressed in terms of node value identifiers found in the node value entries, and hierarchy parent entries for parent-child pairs of hierarchy values. A node value entry contains a node value, a node hash value generated from the node value by a first hashing algorithm, and the node value identifier. The node hash value defines the node value entry in which the corresponding node value is stored. The hierarchical value entry contains a hierarchical value represented by the node value identifiers that correspond to the node values that make up the hierarchical value. The hierarchical value entry also contains a hierarchical value hash value derived from the node value identifier representation of the hierarchical value using a second hashing algorithm and a hierarchical value identifier. The hierarchical value hash defines the hierarchical value entry in which the corresponding hierarchical value is stored. A hierarchy parent entry contains the hierarchical value identifier for the parent hierarchical value and the hierarchical value identifier for the child hierarchical value. The hierarchy parent entry also contains a depth value representing the distance in nodes between the parent hierarchical value and the node in the child hierarchical value that is furthest from the parent.

When used in a relational database system, the architecture enables a complex query having selection criteria specifying parent hierarchical values and child hierarchical values of varying depths to be performed with a single join of hierarchy value entries with hierarchy parent entries that satisfy the selection criteria. Because the entries are limited in size, the hierarchical values that satisfy the selection criteria fit into memory, increasing the speed of the join operation and thus the result of the query. The first and second hashing algorithms permit rapid insertion of new data into the data structure when new hierarchical values are stored in the data store. Furthermore, the relationship between hierarchical value identifiers and hierarchical values in the hierarchical value entries decreases the processing time necessary to convert between identifiers and hierarchical values when necessary.

The architecture is equally applicable for use with other types of hierarchical data, such as managing objects in an object-oriented programming environment. Thus, the architecture enables rapid processing of complex queries in different types of hierarchical data environments and does so without greatly impacting the storage time of new values.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 2 illustrates prior art relational database tables used to store the hierarchical data structure of FIG. 1.

FIG. 3 illustrates the prior art relational database tables in FIG. 2 in a normalized form.

FIGS. 7A–C illustrate a system-level overview of an exemplary embodiment of the invention;

FIGS. 11A–C show relational database tables created by an exemplary implementation of the invention to store the hierarchical data structure of FIG. 10.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be and the operating environment in conjunction with which embodiments of the invention may be practiced are described. In the second section, a system level overview of the invention is presented. In the third section, methods for an exemplary embodiment of the invention are provided. In the fourth section, a particular World Wide Web implementation of the invention is described. Finally, in the fifth section, a conclusion of the detailed description is provided.

Hardware and Operating Environment

Figure 5:
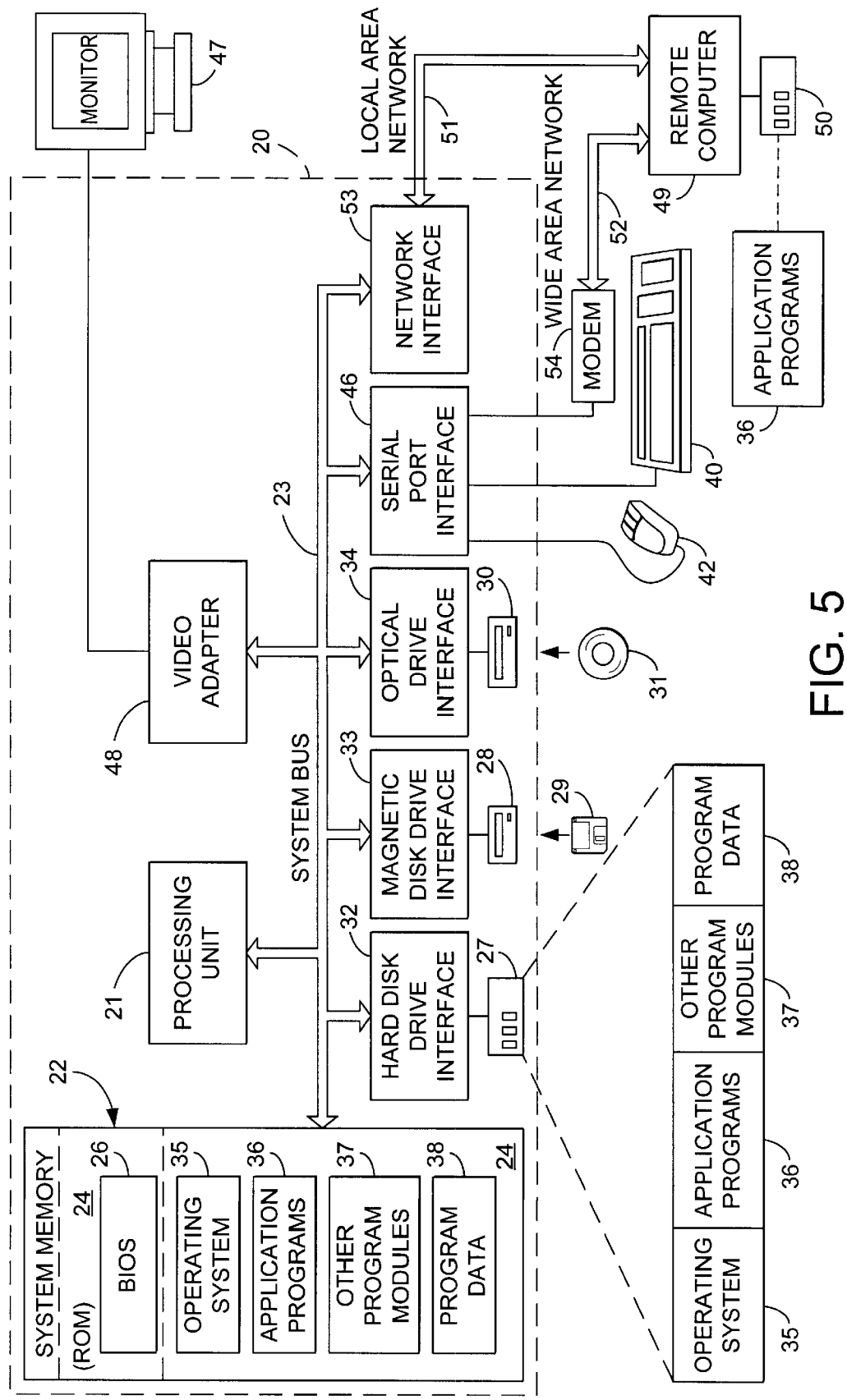
FIG. 5 shows a diagram of the hardware and operating environment in conjunction with which embodiments of the invention may be practiced.

FIG. 5 is a diagram of the hardware and operating environment in conjunction with which embodiments of the invention may be practiced. The description of FIG. 5 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 5 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. a basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 1:
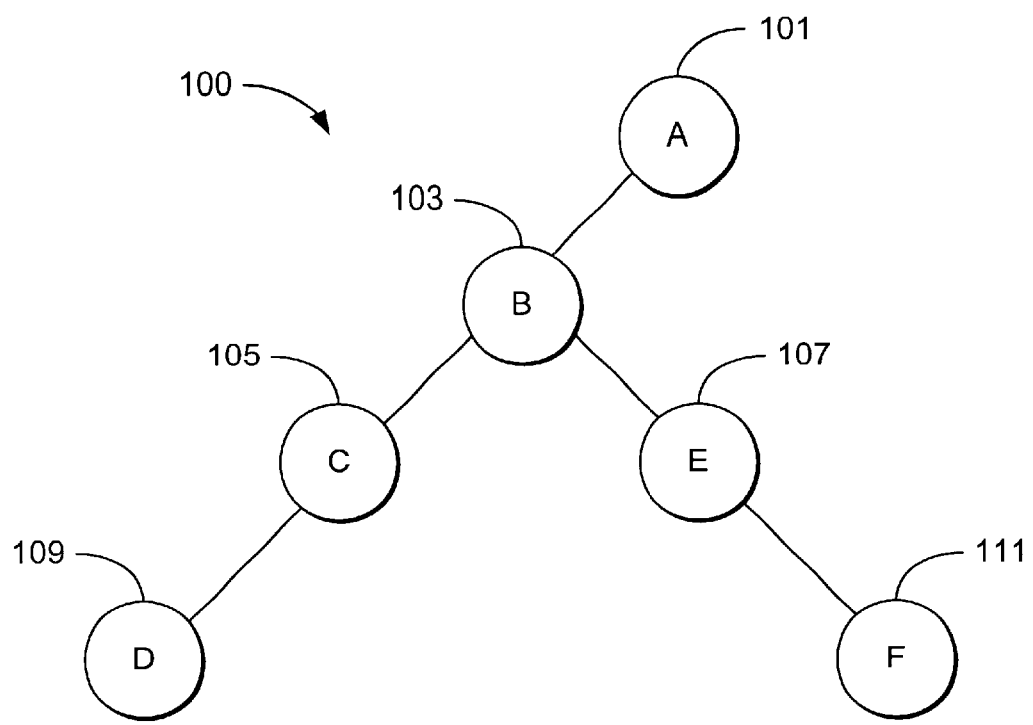
FIG. 1 shows a hierarchical data structure logically represented as a data tree.
Figure 4:
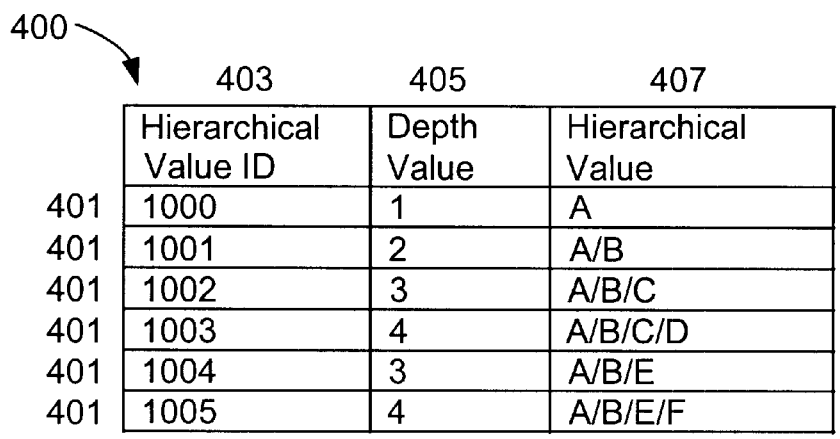
FIG. 4 illustrates an alternate prior art relational database table used to store the hierarchical data structure of FIG. 1.

A system level overview of the operation of an exemplary embodiment of the invention is described by reference to FIGS. 6 and 7A–C which may be practiced on a stand-alone computer, such as computer 20 in FIG. 1, or in a client/server networked environment.

Figure 6:
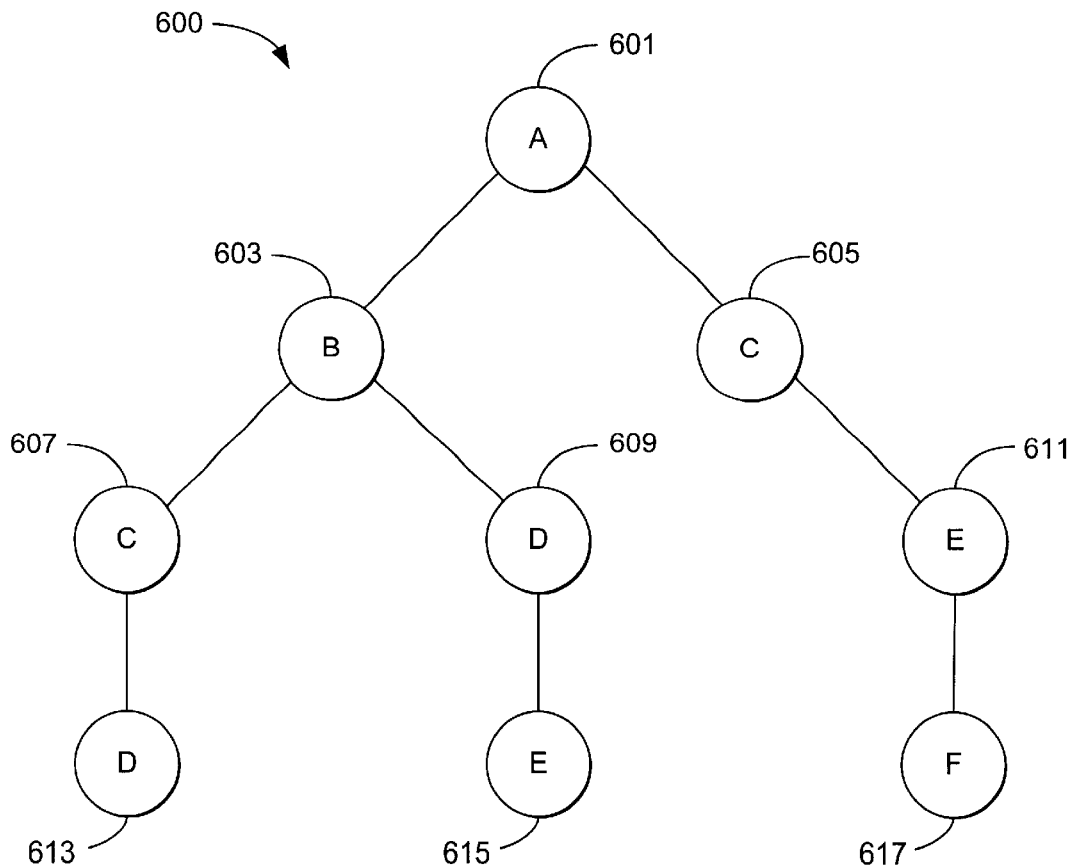
FIG. 6 is a diagram of a hierarchical data structure for use in illustrating an exemplary

FIG. 6 illustrates a hierarchical tree 600 having node A 601 as its root node, nodes B 603 and C 605 at level two, nodes D 609, E 611, and a second instance of node C 607 at level three, node F 617 and second instances of node D 613 and E 615 at level four. Because each node is uniquely identified by its hierarchical value, node C 607 with hierarchical value A/B/C and node C 605 with hierarchical value A/C are different nodes. Three hierarchical values shown in FIG. 6 are used as examples in this section: A/B/C/D, A/B/D/E, and A/C/E/F.

The invention uses three data structures, shown as database tables in FIGS. 7A, 7B and 7C, to manage hierarchical values: node table 700, hierarchy value table 710 and hierarchy parent table 720. The node table 700 consists of unique instances of node values collected from all hierarchical values present in the tree 600. For each unique node value, the invention uses a first hashing algorithm to generate a node hash value 705 that identifies a row 701 in the node table 700. The invention assigns a unique node identifier 703 to the node value and stores the node identifier 703, the node hash value 705, and the node value 707 in the row 701 identified by the node hash value 705. In the embodiment shown in FIG. 7A, the node identifiers 703 are stored as binary numbers but a decimal format is used for clarity in explanation. The tree 600 contains six unique node values 707, resulting in six rows 701 being stored in the table 700.

The hierarchy value table 710 (FIG. 7B) contains all the unique hierarchical values present in the tree 600. Each unique hierarchical value is translated from its character data representation, i.e., A/B/C/D, into a node identifier representation 717, i.e., 1001–1002–1003–1004, by hashing each node value in the hierarchical value using the first hashing algorithm to find the corresponding node identifiers in the node table 700 and concatenating the found node identifiers. The invention uses a second hashing algorithm on the node identifier representation 717 to generate a hierarchical value hash value 715 that identifies a row 711 in hierarchy value table 710. The invention assigns a unique hierarchical value identifier 713 to the hierarchical value 717 and stores the hierarchical value identifier 713, the hierarchical value hash value 715, and the node identifier representation 717 of the hierarchical value in the row 711 identified by the hierarchical value hash value 715. Thus, the invention creates nine entries in the hierarchy value table 710 for the unique hierarchical values in data tree 600.

Comment 719 is shown to facilitate understanding of the invention and is not actually stored in table 710. Furthermore, in the embodiment of the hierarchy value table shown in FIG. 7B, each hierarchical value 717 is a concatenation of the node identifiers stored in binary format; the representation in FIG. 7B as decimal numbers with dashes separating the node identifiers is for ease in explanation. Alternate embodiments in which the hierarchical values are stored in other data formats, such as hexadecimal or octal, are equally applicable. As shown, the hierarchy value table 700 accommodates variable length hierarchical values 717. However, alternate embodiments in which a fixed length field is used to store the node identifier representations 717 is also contemplated and within the scope of the invention.

The hierarchy parent table 720 shown in FIG. 7C stores relationships between all parent nodes and all children nodes as parent-child pairs. Thus, the hierarchical value A/B/C/D represents four parent-child pairs for hierarchical value A, i.e., A—A, A—A/B, A—A/B/C, and A—A/B/C/D, and three parent-child pairs for hierarchical value A/B, i.e., A/B–A/B, A/B–A/B/C, and A/B–A/B/C/D. Each row for a parent-child pair 721 consists of a parent hierarchical value identifier 723, a child hierarchical value identifier 725, and a depth value 727 that represents the distance in hierarchy levels from the parent to the child. The parent hierarchical value identifier 723 and the child hierarchical value identifier 725 are determined from the hierarchy value table 710 and are stored in binary format. Comment column 729 is only shown for purposes of illustration in FIG. 7C.

Because every hierarchical value in the tree 600 is expanded into parent-child pairs the number of rows in the hierarchy parent table 720 can be quite large. Assuming an average depth of D for the hierarchical values in the tree 600 and a number of nodes N, the approximate number of rows is (D(D−1)/2+D)*N. Thus, if there are 100,000 nodes with an average depth of 8, the number of rows is approximately 3.6 million. However, because the parent hierarchical value identifier 723 and the child hierarchical value identifier 725 are in binary format, a four-byte field for each can uniquely identify approximately four billion hierarchical values. Add to this a two-byte field for the depth value 727 and each row consumes a mere 10 bytes of space. Therefore, a hierarchy parent table 720 having 3.6 million rows is only 36 MB (megabytes) in size.

The embodiment described above employs two different hashing algorithms. The first hashing algorithm is chosen to produce optimal results when hashing character data for the node table 700, such as a string bit shifting algorithm. The second is chosen to produce optimal results when hashing binary data for the hierarchy value table 710, such as the well-known MD5 hashing algorithm. The use of the same hashing algorithm to produce both tables 700 and 710 is an alternate embodiment envisioned by the inventor. The hashing algorithms preferably require minimal memory and processor cycles, resulting in faster processing.

Conversion of hierarchical value identifiers to hierarchical values is accomplished by traversing the hierarchy value table 710 until a matching hierarchical value identifier 713 is found. Alternately, the hierarchical value identifiers 713 are indexed so that the matching row can be more quickly located.

The combination of the node table 700 and the hierarchy value table 710 speeds the conversion of hierarchical values to hierarchical value identifiers. Instead of having to traverse a database table row-by-row as in the prior art, the invention hashes each node value in the target hierarchy value to find the corresponding node identifiers in the node table 700, creates a node identifier representation of the hierarchical value from the found node identifiers, hashes the node identifier representation, and returns the hierarchical value identifier in the row in the hierarchical value table 710 defined by the hash value. Increasing the conversion speed decreases the time necessary to perform search operations required for complex queries.

The addition of the hierarchy parent 720 enables fast queries for children of any depth, or all children, or all children up to a certain depth for any given set of parent hierarchical values. The invention translates the hierarchical value of the parent nodes into the corresponding hierarchical value identifiers using the hierarchical value table 710 (as discussed above) and extracts all matching rows from the hierarchy parent table 720 in a single pass. The invention then traverses the hierarchy parent table 720 and extracts all rows that satisfy the depth criteria specified in the query. A single relational database join operation on the two sets of extracted rows produces the answer to the query. Furthermore, because the entries in the tables are small in size, the extracted rows likely fit within memory and thus the join operation can be executed quickly.

The system level overview of the operation of an exemplary embodiment of the invention has been described in this section of the detailed description. A combination of data structures decreases the time necessary to convert between hierarchical values and hierarchical value identifiers, and to process complex queries involving relationships between parent and children nodes in a hierarchical data structure. The data structures described above can also be indirectly addressed using hashing algorithms which essentially split the data into smaller subsets. Such hashing algorithms are particularly suited for batch use to subdivide large data structures found in a data warehouse environment, as described below, thus speeding subsequent interactive queries. While the invention is not limited to any particular underlying file system, for sake of clarity a simplified relational database system has been described.

Methods of an Exemplary Embodiment of the Invention

In the previous section, a system level overview of the operation of an exemplary embodiment of the invention was described. In this section, the particular methods performed by a stand-alone computer or a computer acting as a server in a networked environment in such an exemplary embodiment are described by reference to a series of flowcharts. The methods to be performed by the computer constitute computer programs made up of computer-executable instructions. Describing the methods by reference to a flowchart enables one skilled in the art to develop such programs including such instructions to carry out the methods on suitable a computer (the processor of the computer executing the instructions from computer-readable media).

Figure 8:
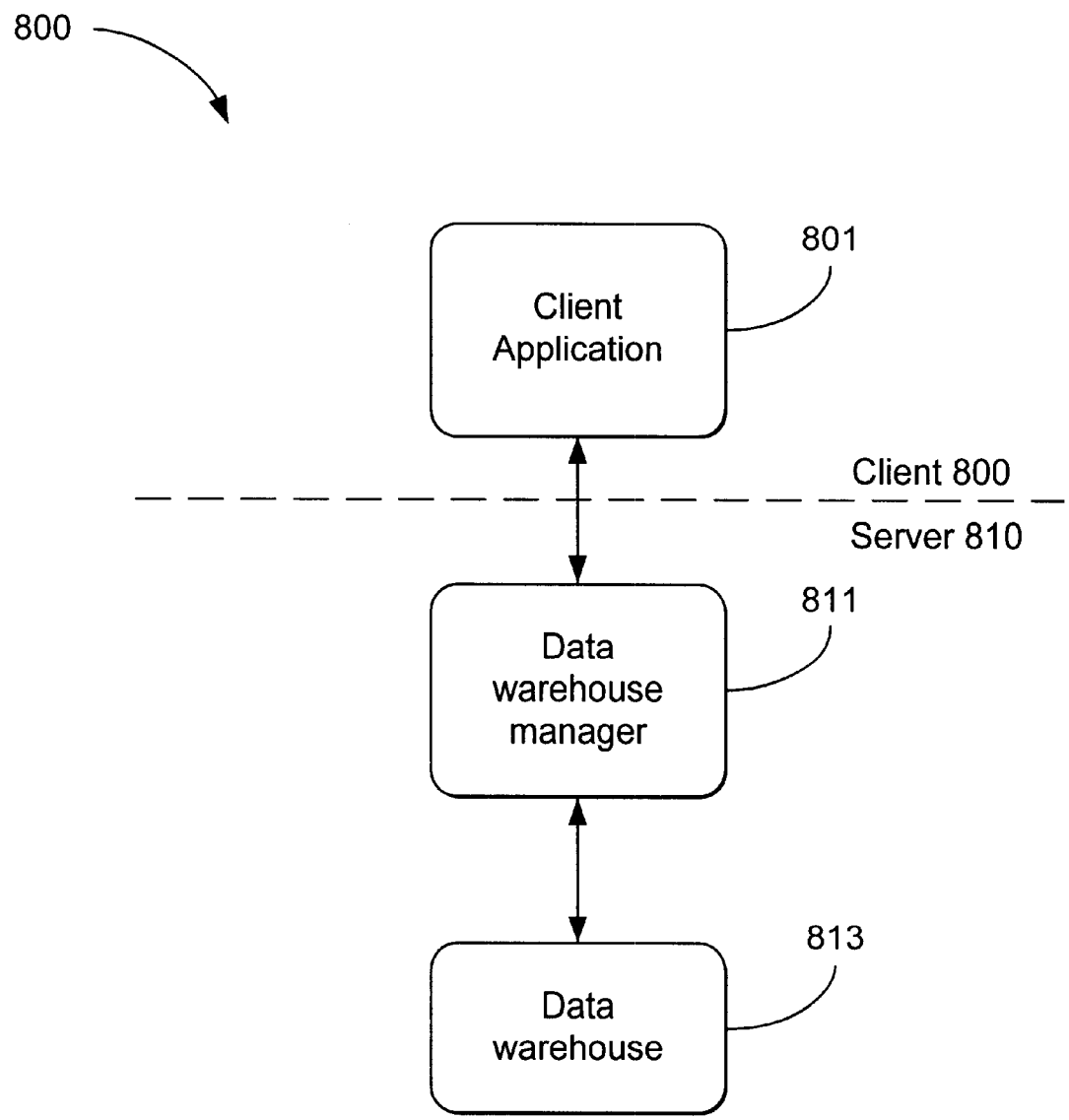
FIG. 8 illustrates an exemplary embodiment of the invention executing in a server as an interface between a relational database and a client application.

Referring first to FIG. 8, an exemplary embodiment of the invention is shown as data warehouse manager 811 residing in a server 810 to provide an interface between a data warehouse 813 on the server and an application 801 in a client 800. The data warehouse 813 contains data that can be accessed through hierarchical value identifiers. The data warehouse manager 811 creates and maintains the three data structures described above for the data in the data warehouse 813. The three data structures are stored in the data warehouse 813. The client application 801 uses the methods of the data warehouse manager 811 to store and retrieve data from the data warehouse 813.

The data structures in the exemplary embodiment of the invention will again be described in terms of relational database tables and, therefore, the data warehouse 813 uses a relational database structure. However, alternate embodiments in which the data structures are relational database tables stored outside of the data warehouse 813 will be readily apparent to one skilled in the art. Furthermore, the data structure of the data warehouse 813 can be based on non-relational structures without departing from the principles of the invention.

Figure 9A:
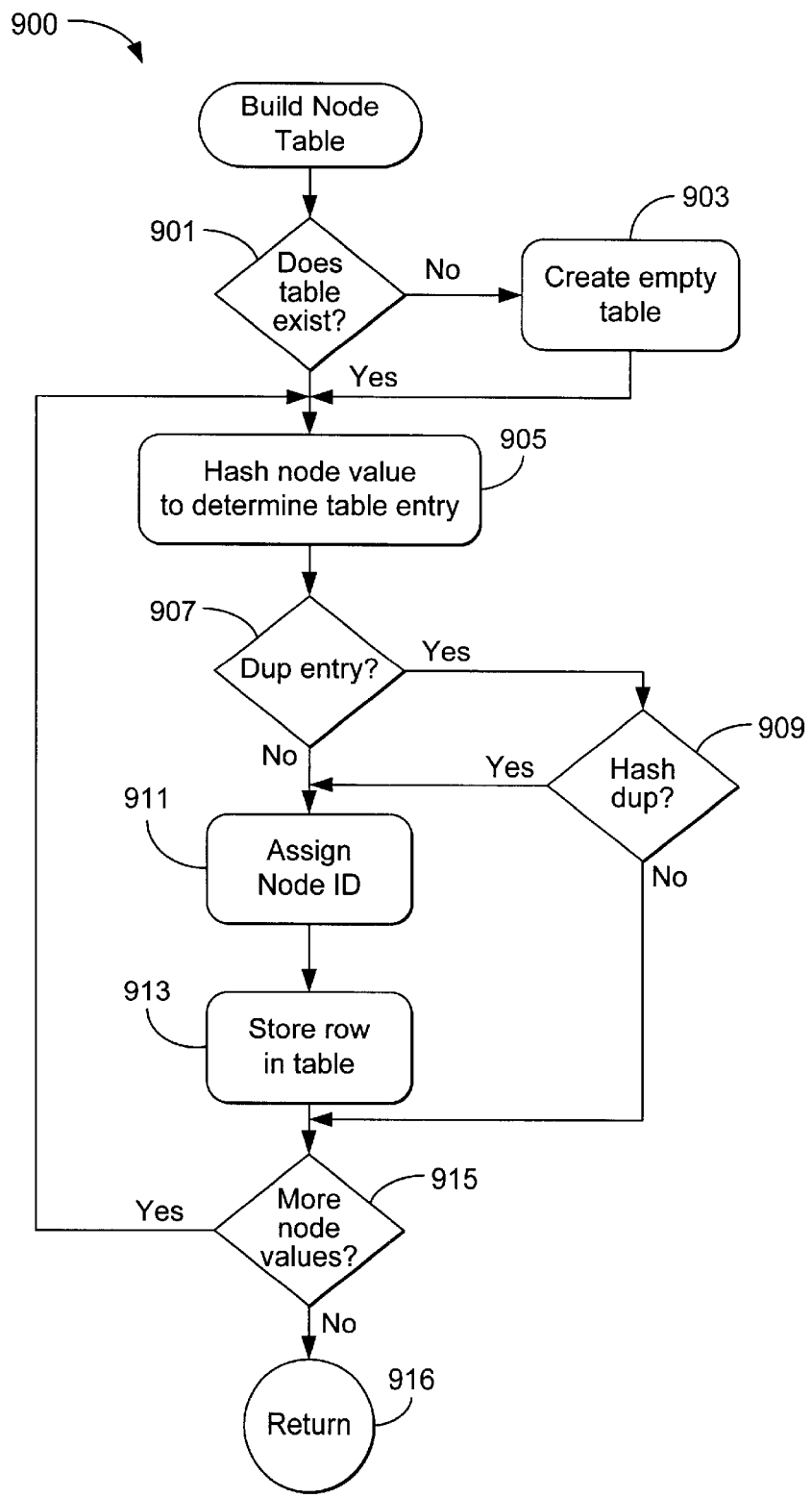
FIGS. 9A–F are flowcharts of methods to be performed by a server according to the exemplary embodiment of the invention shown in FIG. 8.
Figure 9B:
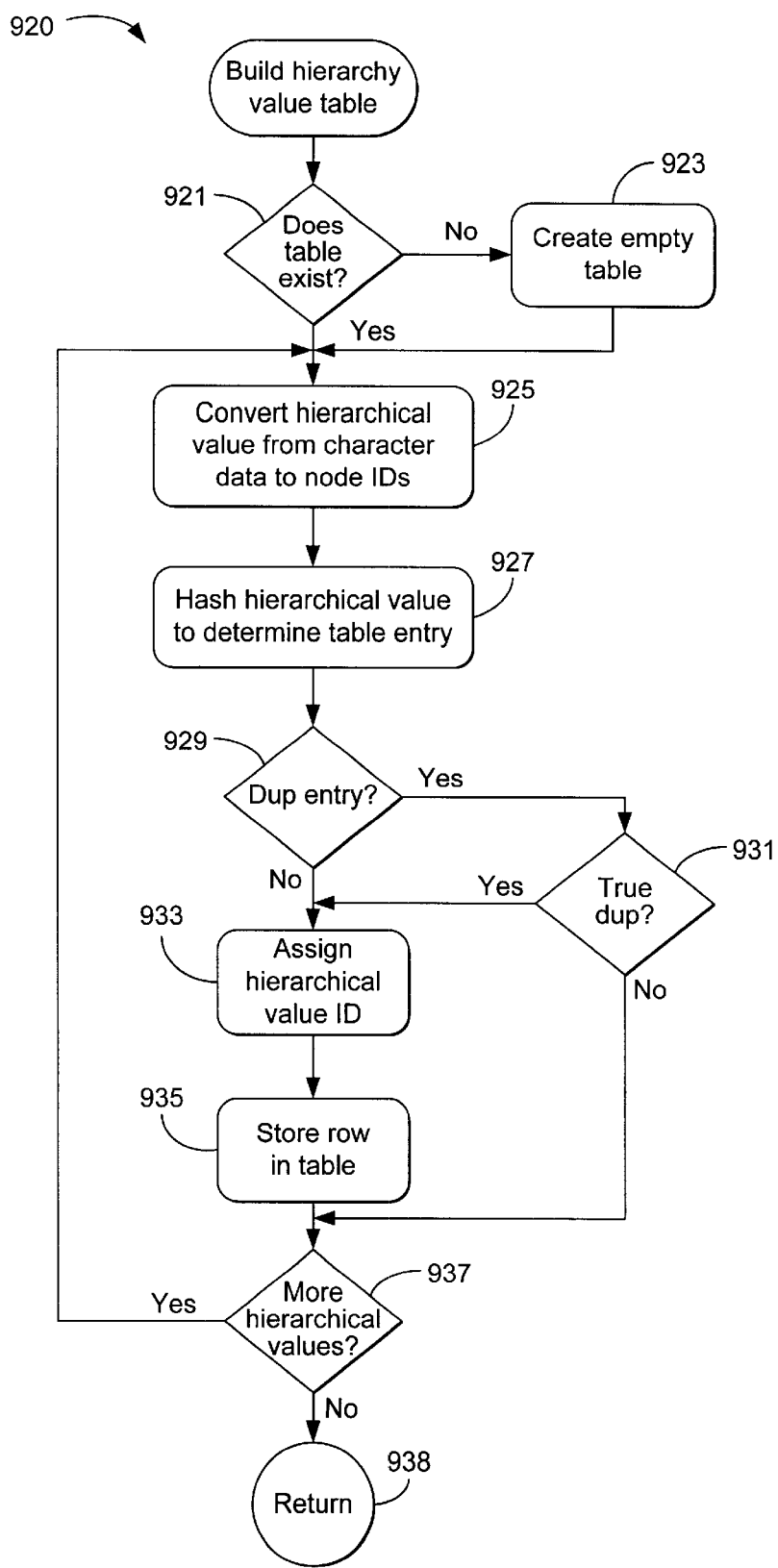
Figure 9C:
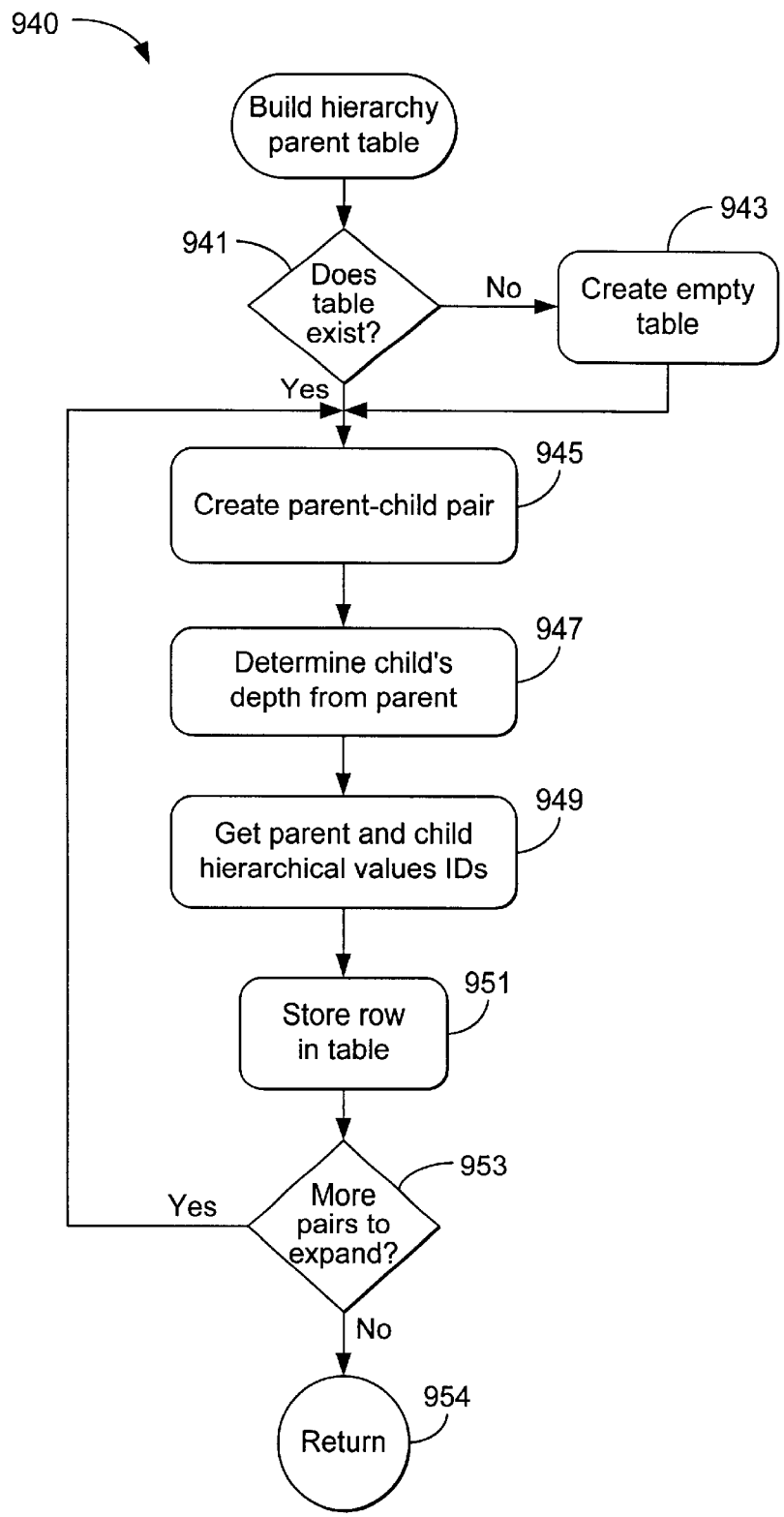
Figure 9D:
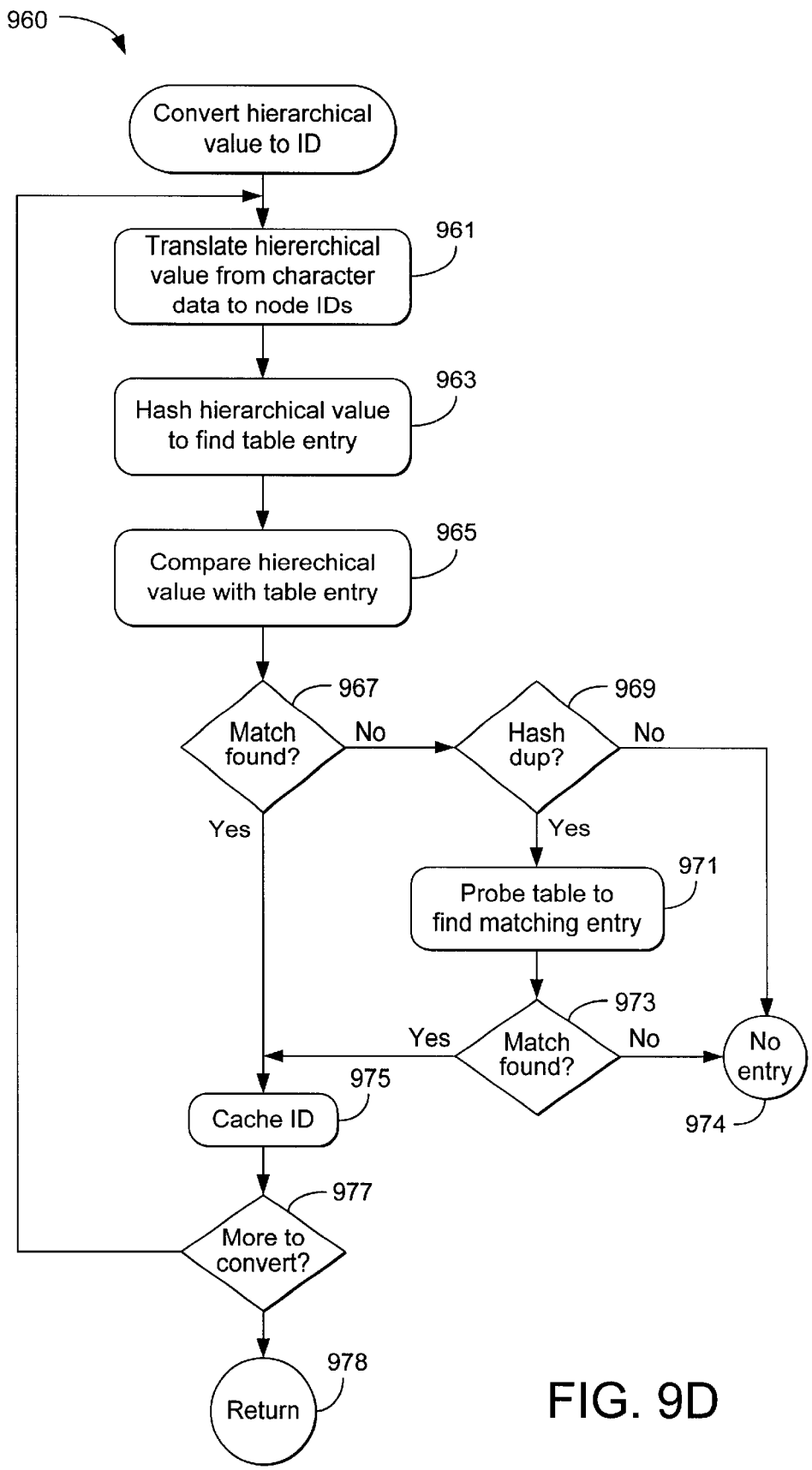
Figure 9E:
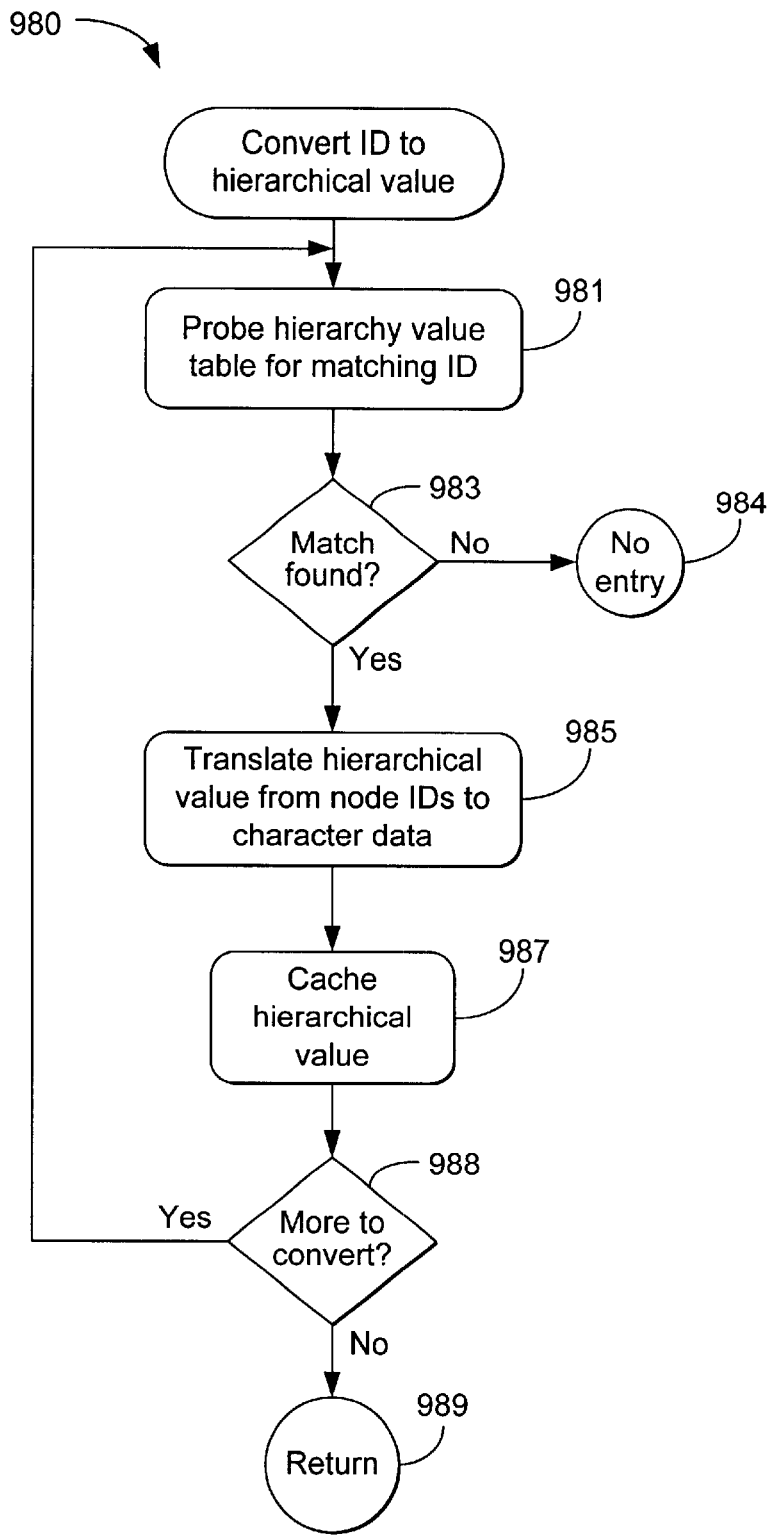
Figure 9F:
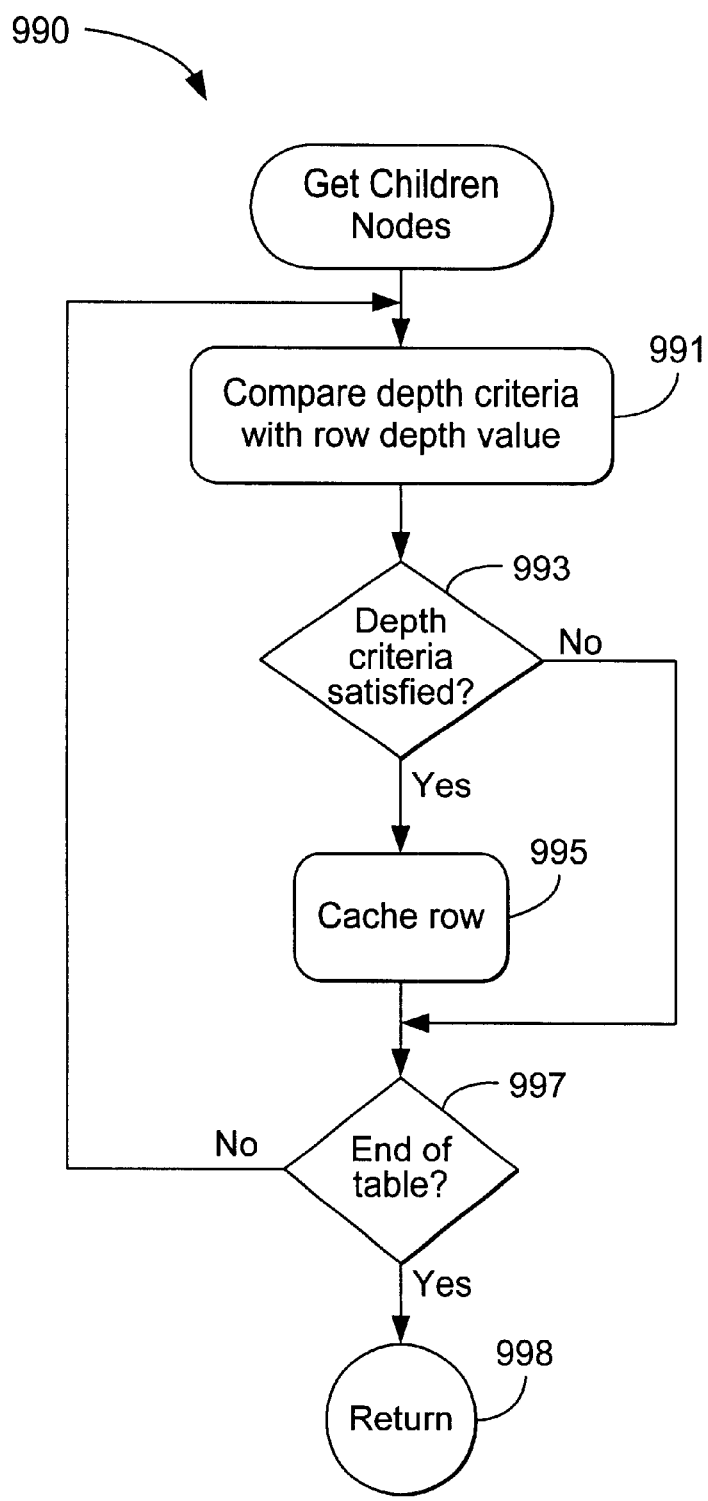

In FIGS. 9A–F, flowcharts of methods to be performed by a server according to an exemplary embodiment of the invention are shown. The methods of FIGS. 9A–F are described with reference to the data structures shown in FIG. 7. These methods are inclusive of the acts required to be taken by the data warehouse manager 811 when creating the node table 700, the hierarchy value table 710 and the hierarchy parent table 720 from hierarchical values stored in the data warehouse 813 (FIGS. 9A–C), when converting between hierarchical values and hierarchical value identifiers (FIGS. 9D–E) and when finding children nodes of a certain depth from a particular parent hierarchical value (FIG. 9F).

The methods 900, 920 and 940 shown in FIGS. 9A–C are described as being periodically performed on the hierarchical values stored in the data warehouse 813 in a batch processing mode. However, the data warehouse manager 811 can process a single hierarchical value as it is stored without departing from the logic shown in FIGS. 9A–C.

After the data warehouse manager 813 determines that the node table 700 for the data warehouse 813 exists (block 901) or creates an empty node table 700 (block 903), the data warehouse manager 813 passes each node value 707 in the data warehouse 813 through the first hashing algorithm to generate the corresponding node hash value 705 (block 905). The data warehouse manager determines if the entry 701 defined by the hash already contains data (block 907). If not, then the data warehouse manager 811 assigns a unique node identifier 703 to the node value (block 911) and stores a row 701 for the node value into the node table 700 (block 913).

If, however, the entry is a duplicate, the entry can be a true duplicate in which the hash value contained in the table entry matches the just-generated hash value or a hash duplicate (block 909). The fact that two unique values input into a hashing algorithm can result in the same table entry is well known in the art. If the entry is a hash duplicate, the data warehouse manager 811 uses any of the well-known methods for handling hash duplicates to create an entry for the hierarchical value and proceeds through blocks 911 and 913 as before. On the other hand, a true duplicate means the node value has already been stored in the node table and thus no more processing need be done.

The data warehouse manager 811 continues to process node values in the data warehouse 813 until all unique values have been entered into the node table 700.

Once the data warehouse manager 811 has processed all unique node values in the data warehouse 813, the data warehouse manager 811 builds the hierarchy value table 710 for the unique hierarchical values in the data warehouse 813. As before, the data warehouse manager 811 determines if a hierarchy value table 710 exists for the data warehouse 813 (block 921) and creates one if it does not (block 923). The data warehouse manager 811 converts each hierarchical value from its character data representation (shown as Comment 719) to its node identifier representation 717 using the node table 700 (block 925) by passing each character in the hierarchical value through the first hashing algorithm to locate the node table entry 701 holding the corresponding node identifier 703. The resulting node identifier representation of the hierarchical value 717 is used to generate the hierarchical value hash value 715 (block 927), as will be described in more detail below in conjunction with FIG. 9D. As with the node table 700, both true duplicate and hash duplicates can exist in the hierarchy value table 710 and are processed at blocks 929 and 931 as described above in conjunction with node table 700.

The data warehouse manager 811 assigns unique hierarchical value identifiers to unique hierarchical values and stores a row 711 in the hierarchy value table 710 for each. The data warehouse manager 811 continues to process the data warehouse 813 until all unique hierarchical values have been stored in the hierarchy value table 710 (block 937).

One the hierarchy value table 710 has been completed, the data warehouse manager 811 builds the hierarchy parent table 720 using the entries in the hierarchy value table 710. The hierarchy parent table 720 is created if one associated with the data warehouse 813 does not already exist (blocks 941 and 943). Each hierarchy value in the hierarchy value table 710 is expanded into parent-child pairs (block 947) and the depth of the child hierarchical value from the parent hierarchical value in each pair is determined (block 947) by parsing the path from each parent to each child.

The hierarchical values 717 for the parent and child in each pair are used to retrieve the corresponding hierarchical value identifiers 713 (block 948), referring again to the description of FIG. 9D, and a row 721 is stored in the hierarchy parent table 720 for each parent-child pair (block 953). The data warehouse manager 811 continues to expand hierarchical values into parent-child pairs until no unique parent child pairs remain to be processed.

FIG. 9D describes in more detail the method 960 used to convert a hierarchical value from character-based data to a hierarchical value 713. Although the method 960 uses both the first and second hashing algorithms, the handling of hash duplicates is described only in terms of the second hashing algorithm for the sake of clarity, but the method is equally applicable to hash duplicates resulting from the first hashing algorithm.

The data warehouse manager 811 translates the hierarchical value from character data to node identifiers using the first hashing algorithm on the character data and retrieving the corresponding node identifiers from the node value table 700 (block 961). The data warehouse manager 811 then passes the node identifier representation of the hierarchical value through the second hashing algorithm to locate the corresponding entry 711 in the hierarchy value table 710 (block 963). Because hash duplicates can occur, the data warehouse manager 811 compares the node identifier representation of the searched-for hierarchical value with the node identifier representation of the hierarchical value 717 in the table 710. The hierarchical value identifier 713 is extracted from a matching row 711 (block 967). When the method 960 is used to convert multiple hierarchical values into hierarchical value identifiers, such as when processing a database query, each hierarchical value identifier is cached in temporary storage, such as memory, (block 975) until all of the hierarchical values have been converted (block 977) which are then returned as a temporary table (block 978). If only a single hierarchical value is to be converted, the returned table contains a single hierarchical value identifier 713.

On the other hand, if there is no match but the row 711 in the table 710 contains data, the second hashing algorithm has produced a hash duplicate (block 969) and the table 710 is probed to find the true entry (block 971). As will be readily apparent to one skilled in the art, the method used to probe the table depends on the method employed to store hash duplicates, and thus will not be discussed further. If no true entry is found (block 971), or if the row 711, does not contain data, there is no entry in the hierarchy value table 710 for the hierarchical value (block 974).

When the method 960 is employed to build the parent hierarchy table 720, a "no entry" result (block 974) is treated as a "not found" condition by the data warehouse manager 811. When the method 960 returns a temporary table of hierarchical value identifiers to be used in further query processing, a "no entry" result (block 974) may or may not be an error, depending on the structure of the query.

When converting from a hierarchical value identifier to a hierarchical value as shown in FIG. 9E, data warehouse manager 811 probes the hierarchy value table 710 to find a matching hierarchical value identifier. As discussed before, the probe varies depending on the handling of hash duplicates. If a matching entry is not found, (block 983) a "no entry" result is returned (block 984).

If a match is found, the node identifier representation of the hierarchical value in the matching entry is converted to the character representation of the hierarchical value by probing the node table 700 (block 985). The resulting character representation is cached (block 987) until no hierarchical values remain to be converted (block 988).

FIG. 9F illustrates the method 990 used by the data warehouse manager 811 to return all children that are a certain depth from their parents. The data warehouse manager 811 scans the hierarchy parent table 720 for rows 721 having a depth value 727 that satisfies the depth criteria (block 991). Matching rows 721 are cached (blocks 993 and 995) and returned in a temporary table when the end of the hierarchy parent table 720 is reached (block 997).

The use of methods 960 and 990 in greatly decreasing the time necessary to perform complex database query processing on hierarchical values stored in the data warehouse 813 will be immediately apparent to one skilled in the art and is explained in detail in the fourth section using a data warehouse of Web page hierarchical values stored on a World Wide Web server as an example.

The particular methods performed by a data warehouse manager in a server of an exemplary embodiment of the invention have been described. The methods performed by the data warehouse manager has been shown by reference to flowcharts in FIGS. 9A–D including all the blocks from 901 through 998.

WWW Data Warehouse Server Implementation

In this section of the detailed description, a particular implementation of the invention is described that is a personalization system on a World Wide Web (WWW) server that dynamically generates Web pages based on stored user preferences that allows the server to deliver targeted content to each site visitor.

Figure 10:
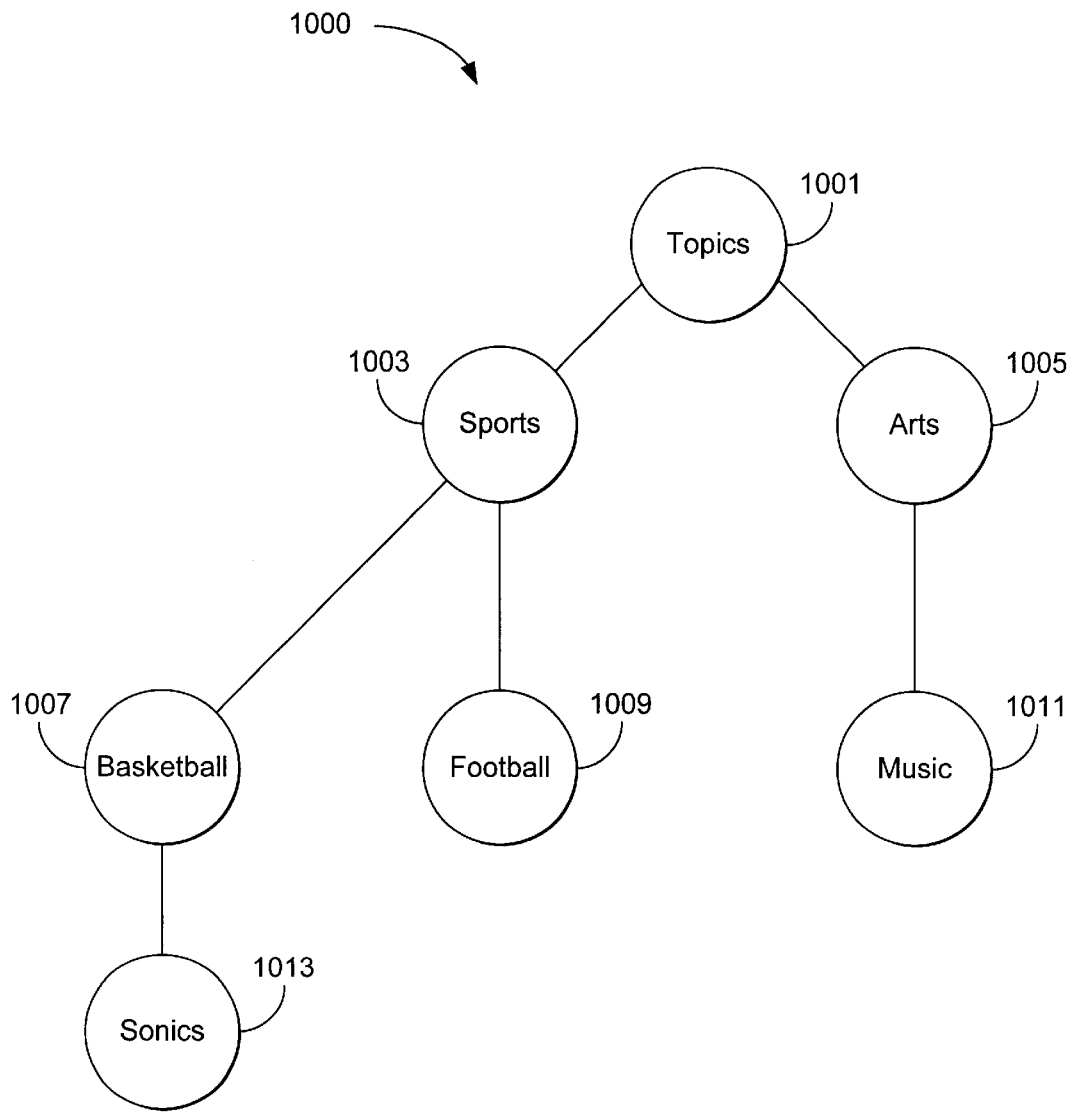
FIG. 10 is a diagram of a hierarchical data structure for use in an exemplary implementation of the invention.

WWW servers often offer personalization services by establishing a web page tailored to the user's preferences. The personalization is frequently activated by having the user chose a series of increasingly specific interest areas from a number of drop-down list boxes. For example, to tailor the page for the user's "Topics of Interest," the first list box contains choices such as Arts, Science, Politics, Sports, etc. If the user chooses Sports, the Web server presents the a list box with choices such as Baseball, Basketball, Football, Skiing, etc. If the user chooses Baseball, the user is then presented with a list box containing baseball team names. When the user chooses a team in which he or she is interested, such as the Sonics, the Web server places a "tag" on the user's personal web page in the location the information about the baseball team will be presented. The choices the user makes are referred to as "tag terms." So, for example, the preferences of a user that result from the "Topics of Interest" choices presented to the user are recorded as tags "Topics/Art/Music," "Topics/Sports/Baseball/Sonics," and "Topics/Sports/Football." As will be readily apparent to one skilled in the art, additional tags associated with the user represent other user preferences, such background art for the web page or similar configuration information. FIG. 10 shows a hierarchical tree structure 1000 that logically represents one user's preferences. The top of the hierarchical tree structure 1000 is a root node 1001, or "atom," representing the tag term "Topics," with the other nodes in the tree corresponding to dependent tag terms.

When the user logs onto the server, the server must dynamically create the user's personalized Web page using the current information for the preferences as defined by the tag terms. The server processes the Web page tags and retrieves the information from a data store (analogous to the data warehouse 813), usually a relational database. Browsing a relational data warehouse by following the tag terms down the hierarchy 1000 from the root node 1001 is very time and computer-processor expensive as such browsing requires as many query language "join" operations as there are tag terms below the root node. Alternatively, storing the data warehouse address of the information identified by each tag associated with the user's personalized page is also expensive in terms of storage space and maintenance required to validate the addresses as the information in the data warehouse is updated.

Instead, using the data structures and methods described above, when the Web page is stored, a server collects the tags and creates corresponding entries in the data structures. Using the tree structure in FIG. 10 as an example, the tags Topics/Art/Music, Topics/Sports/Baseball/Sonics, and Topics/Sports/Football are parsed and stored into a node table 1100, a hierarchy value table 1110, and a hierarchy parent table 1120 shown in FIGS. 11A–C. The tables in FIG. 11A, 11B and 11C are analogous to the tables in FIG. 7A, 7B and 7C, respectively.

Now, when the server needs to process a section of the user's Web page devoted to sports, the component that builds the Web page (analogous to the client application 801) constructs a query requesting the hierarchical value identifiers for the lowest nodes of the data tree 1000 identified by the tag Topics/Sports/. An enhanced relational data storage hierarchical manager (ERDS) component (analogous to the data warehouse manager 811) fulfills the selection criteria of the query. ERDS uses the node table 1100 and the hierarchy value table 1110 to determine the hierarchical value identifier of 10002 for the base parent tag term Topics/Sports. ERDS next creates a temporary table containing all the rows in the parent hierarchy table 1120 which have a parent hierarchical value identifier 1123 that match the hierarchical value identifier of the base parent tag term (10002) or the hierarchical value identifiers (10003, 10004, 10005) of the parent tag terms below Topics/Sports/ in the hierarchy. ERDS then creates a temporary table containing all the rows in the parent hierarchy table 1120 having the greatest depth from their parent tag term. A single join operation performed on the two temporary tables results in child hierarchical value identifiers 10004 and 10005 corresponding to Topics/Sports/Baseball/Sonics, and Topics/Sports/Football. In an alternate embodiment, ERDS creates a cluster index table for the parent hierarchical value identifiers when the hierarchy parent table 1120 is created so that the join can proceed even more rapidly since the data in cluster index table is physically arranged in index order.

Conclusion

An architecture for managing hierarchical values to produce rapid complex query results has been described. Because the entries in the data structures are limited in size, the hierarchical values that satisfy the query selection criteria fit into memory, increasing the speed of the query. The first and second hashing algorithms permit rapid insertion of new data into the data structure when new hierarchical values are stored in the data store. Furthermore, the relationship between hierarchical value identifiers and hierarchical values in the hierarchical value entries decreases the processing time necessary to convert between identifiers and hierarchical values when necessary.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to is meant to include all environments that store and retrieve data having hierarchical characteristics. Therefore, it is manifestly intended that this invention be limited only by the following claims and equivalents thereof.

What is claimed is:

1. A computer-readable medium having stored thereon a data structure for managing hierarchical values having multiple nodes, the data structure comprising:
  a plurality of node value entries, each node value entry comprising
    a node value data field containing data representing a unique node value,
    a node hash value data field functioning to identify the node value entry and derived from the node value data field using a first hashing algorithm, and
    a node value identifier data field functioning to identify the node value in the node value data field; and
  a plurality of hierarchy value entries, each hierarchy value entry comprising
    a hierarchical value data field derived from each node value identifier that identifies the node value entry corresponding to each node value in a unique hierarchical value,
    a hierarchical value hash value data field functioning to identify the hierarchy value entry and derived from the hierarchical value data field using a second hashing algorithm, and
    a hierarchical value identifier data field functioning to identify the hierarchical value in the hierarchical value data field.

2. The computer-readable medium of claim 1, wherein the data structure further comprises:
  a plurality of hierarchy parent entries, each hierarchy parent entry comprising
    a parent hierarchical value identifier data field containing the hierarchical value identifier that identifies a parent hierarchical value,
    a child hierarchical value identifier data field containing the hierarchical value identifier the identifies a child hierarchical value dependent upon the parent hierarchical value, and
    a depth value data field containing data representing a distance in nodes between the parent hierarchical value and the node in the child hierarchical value furthest from the parent hierarchical value.

3. The computer-readable medium of claim 1, wherein the node value is in a first format and the node value identifier is in a second format.

4. The computer-readable medium of claim 3, wherein the first hashing algorithm is optimized for data in the first format and the second hashing algorithm is optimized for data in the second format.

5. The computer-readable medium of claim 1, wherein the node value and the node value identifier are in a single format.

6. The computer-readable medium of claim 5, wherein the first and second hashing algorithms are a single algorithm optimized for data in the single format.

7. The computer-readable medium of claim 1, wherein the hierarchical value data field is derived from the node value identifiers corresponding to the node value in the hierarchical value by concatenating the node identifiers.

8. A computer-readable medium having computer-executable instructions to cause a computer to perform acts comprising:
  locating an entry in a node value data structure to store a unique node value by processing the node value through a first hashing algorithm;
  storing the node value, a node hash value generated by the first hashing algorithm, and a unique node identifier in the entry located by the first hashing algorithm;
  locating an entry in a hierarchy value data structure to store a unique hierarchical value by converting the hierarchical value from a first format to the node identifiers corresponding to the node values of the hierarchical value and processing the node identifiers through a second hashing algorithm; and
  storing the node identifiers corresponding to the node value of the hierarchical value, a hierarchical value hash value generated by the second hashing algorithm, and a unique hierarchical value identifier in the entry located by the second hashing algorithm.

9. The computer-readable medium of claim 8, wherein the computer-executable instructions cause the computer to perform further acts comprising:
  locating an entry in the hierarchy value data structure containing a unique hierarchical value by converting the hierarchical value from the first format to the node identifiers corresponding to the node values of the hierarchical value and processing the node identifiers through the second hashing algorithm; and
  outputting the hierarchical value identifier of the entry located by the second hashing algorithm if the node identifiers in the entry match the node identifiers of the hierarchical value.

10. The computer-readable medium of claim 8, wherein the computer-executable instructions cause the computer to perform further acts comprising:

outputting the node identifiers in a entry in the hierarchical value data structure if the hierarchical value identifier in the entry matches a input hierarchical value identifier.

11. The computer-readable medium of claim 8, wherein the computer-executable instructions cause the computer to perform further acts comprising:

storing an entry in a hierarchy parent data structure for a parent-child hierarchy value pair containing the hierarchical value identifiers for the parent and the child hierarchy values, and a depth value representing a distance between the parent and the child.

12. The computer-readable medium of claim 11, wherein the computer-executable instructions cause the computer to perform further acts comprising:

outputting a child hierarchical value identifier if the depth value in the entry for the child hierarchical value satisfies a selection criteria.

13. The computer-readable medium of claim 8, wherein the acts are performed in the order recited.

14. A computerized system comprising:

a processing unit coupled to a memory and a computer-readable medium through a system bus;

computer-executable instructions stored upon the computer-readable medium that cause the processing unit to create, on the computer-readable medium, a node value data structure storing a node hash value generated using a first hashing algorithm and a hierarchy value data structure derived from the node value data structure using a second hashing algorithm; and further computer-executable instructions that cause the processing unit to extract, from the node value data structure, at least one node identifier based on a first selection criteria, and to extract, from the hierarchy value data structure, a hierarchy value identifier using the at least one node identifier.

15. The computerized system of claim 14, wherein:

the computer-executable instructions further cause the processing unit to create, on the computer-readable medium, a hierarchy parent data structure derived from the hierarchy value data structure; and the further computer-readable instructions further cause the processing unit to extract, from the hierarchy parent data structure, a child hierarchy value identifier using the hierarchy value identifier.

16. The computerized system of claim 15, wherein the further computer-readable instructions further cause the processing unit to extract, from the hierarchy parent data structure, a child hierarchy value identifier using a second selection criteria.

17. The computerized system of claim 16, wherein the further computer-readable instructions further cause the processing unit to return the child hierarchy value identifier when the child hierarchy value identifier extracted using the hierarchy value identifier is the same as a child hierarchy value identifier extracted using the second selection criteria.

18. The computerized system of claim 16, wherein the first selection criteria is a hierarchical value and the second selection criteria is a distance from a parent node identified by the hierarchical value to a child node.

19. The computerized system of claim 14, wherein the node value data structure is created from a plurality of node values using a hashing algorithm.

20. The computerized system of claim 14, wherein the hierarchy value data structure is derived from the node value data structure using a hashing algorithm.

21. The computerized system of claim 14, wherein the node value data structure is created from a plurality of node values using a first hashing algorithm and the hierarchy value data structure is derived from the node value data structure using a second hashing algorithm.

* * * * *

UNITED STATES PATENT AND TRADEMARK OFFICE
CERTIFICATE OF CORRECTION

PATENT NO. : 6,279,007 B1
DATED : August 21, 2001
INVENTOR(S) : Radha Krishna Uppala It is certified that error appears in the above-identified patent and that said Letters Patent is hereby corrected as shown below:

Column 4,
Line 2, after the word "exemplary" add -- embodiment of the invention; --.

Column 5,
Line 3, after the word "computer" insert -- 20 --.

Column 15,
Line 6, change "a" to -- an --.

Signed and Sealed this

Seventh Day of May, 2002

Attest:

JAMES E. ROGAN
*Attesting Officer*  *Director of the United States Patent and Trademark Office*